United States Patent
Ogawa et al.

(10) Patent No.: US 10,076,942 B2
(45) Date of Patent: Sep. 18, 2018

(54) SUSPENSION DEVICE

(71) Applicant: TOYOTA JIDOSHA KABUSHIKI KAISHA, Toyota-shi, Aichi-ken (JP)

(72) Inventors: Atsushi Ogawa, Konan (JP); Masaaki Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/689,425

(22) Filed: Aug. 29, 2017

(65) Prior Publication Data

US 2018/0065438 A1 Mar. 8, 2018

(30) Foreign Application Priority Data

Sep. 6, 2016 (JP) .................................. 2016-173705
Feb. 16, 2017 (JP) .................................. 2017-027354

(51) Int. Cl.
*B60G 13/14* (2006.01)
*B60G 17/015* (2006.01)
(Continued)

(52) U.S. Cl.
CPC ............. *B60G 13/14* (2013.01); *B60G 13/18* (2013.01); *B60G 17/016* (2013.01);
(Continued)

(58) Field of Classification Search
CPC .. B60G 13/14; B60G 17/015; B60G 17/0157; B60G 17/016; B60G 17/018; B60G 2202/42; B60G 2202/422; B60G 2300/60; B60G 2600/181; B60G 13/18; B60G 17/06; B60G 2500/10
(Continued)

(56) References Cited

U.S. PATENT DOCUMENTS

| 7,261,171 | B2* | 8/2007 | de la Torre | B60G 13/14 180/165 |
| 8,392,030 | B2* | 3/2013 | Anderson | B60G 13/14 318/375 |
| 8,598,831 | B2* | 12/2013 | Ogawa | B60G 17/06 318/139 |
| 8,833,780 | B2* | 9/2014 | Cheng | B60G 11/14 280/124.179 |

(Continued)

FOREIGN PATENT DOCUMENTS

| EP | 2 452 840 A1 | 5/2012 |
| EP | 2 821 265 A1 | 1/2015 |

(Continued)

*Primary Examiner* — John D Walters
(74) *Attorney, Agent, or Firm* — Oliff PLC

(57) ABSTRACT

A suspension device includes: a spring provided between an upper member and a lower member; a motor provided in juxtaposition with the spring to generate power in accordance with a speed at which a movable shaft is operated, the movable shaft being movable in accordance with operations of the upper member and the lower member in an expansion-contraction direction of the spring; a power consumption circuit including a variable load circuit, the variable load circuit being configured to generate a damping force in the motor by consuming the power generated in the motor and to change the damping force; and an electronic control unit configured to control the variable load circuit such that consumed power by the variable load circuit is increased along with an increase in a speed of the movable shaft.

7 Claims, 9 Drawing Sheets

(51) Int. Cl.
    *B60G 17/016* (2006.01)
    *B60G 17/018* (2006.01)
    *B60G 13/18* (2006.01)
    *B60G 17/06* (2006.01)

(52) U.S. Cl.
    CPC ....... *B60G 17/018* (2013.01); *B60G 17/0157* (2013.01); *B60G 17/06* (2013.01); *B60G 2202/42* (2013.01); *B60G 2300/60* (2013.01); *B60G 2500/10* (2013.01); *B60G 2600/181* (2013.01)

(58) Field of Classification Search
    USPC .................................................. 180/165, 2.1
    See application file for complete search history.

(56) References Cited

U.S. PATENT DOCUMENTS

| | | | |
|---|---|---|---|
| 8,839,920 B2* | 9/2014 | Anderson | B60G 13/14 180/165 |
| 2010/0072760 A1 | 3/2010 | Anderson et al. | |
| 2010/0148463 A1* | 6/2010 | Wang | B60G 13/14 280/124.101 |
| 2010/0262308 A1 | 10/2010 | Anderson et al. | |

FOREIGN PATENT DOCUMENTS

| | | |
|---|---|---|
| JP | 2007-290669 A | 11/2007 |
| JP | 2010-228579 A | 10/2010 |
| JP | 2011-098688 A | 5/2011 |

* cited by examiner

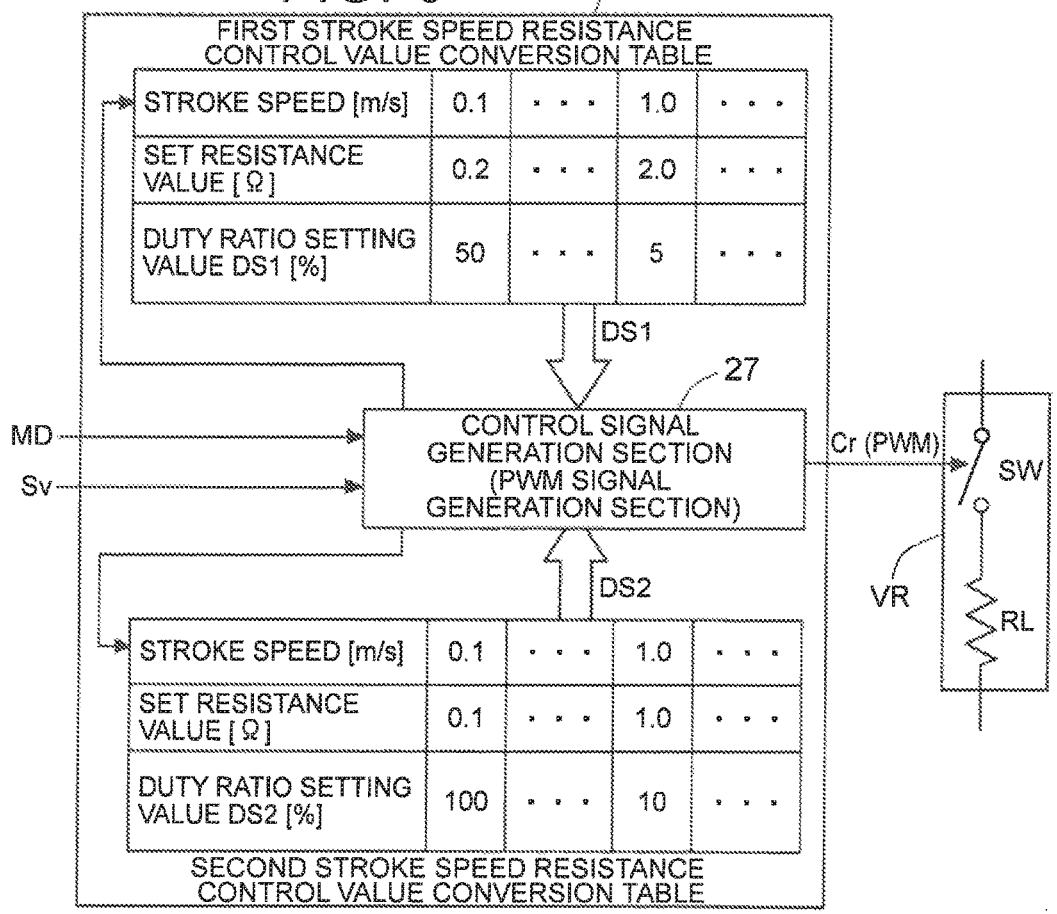
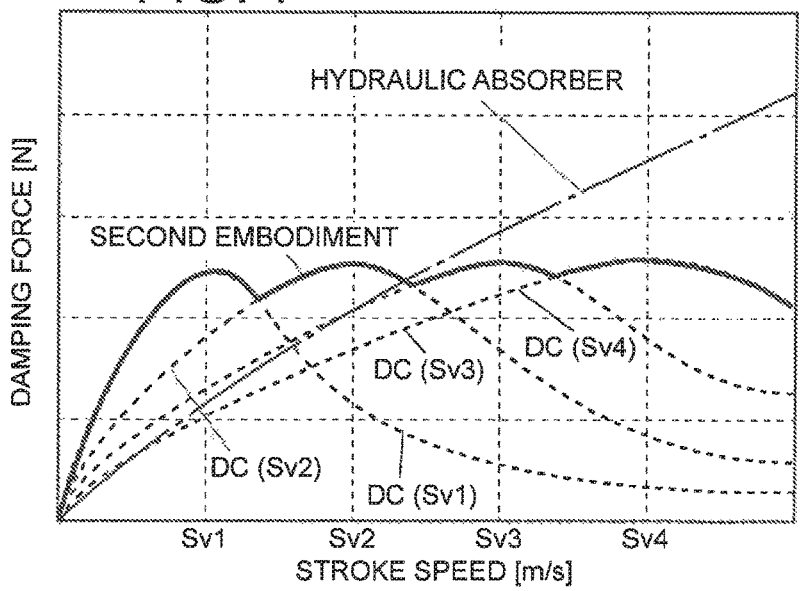

SUSPENSION DEVICE

INCORPORATION BY REFERENCE

The disclosure of Japanese Patent Application No. 2016-173705 filed on Sep. 6, 2016 and Japanese Patent Application No. 2017-027354 filed on Feb. 16, 2017, each including the specification, drawings and abstract, is incorporated herein by reference in its entirety.

BACKGROUND

1. Technical Field

The present disclosure relates to a suspension device. In particular, the present disclosure relates to a suspension device including an electromagnetic absorber that is provided in juxtaposition with a spring of a suspension and converts kinetic energy, which is generated by approaching-separating motion between a spring upper portion and a spring lower portion, to electrical energy, for example.

2. Description of Related Art

In recent years, as a suspension device for a vehicle, an electromagnetic suspension device including an electromagnetic absorber that uses an electromagnetic motor to generate regenerative power and dampens a force in a direction in which a spring upper portion and a spring lower portion approach or separate from each other by a regenerative operation has been examined. One example of the suspension device including such an electromagnetic absorber is disclosed in Japanese Patent Application Publication No. 2010-228579 (JP 2010-228579 A).

A suspension system described in JP 2010-228579 A includes: plural electromagnetic shock absorbers that are respectively provided for plural wheels, and each of which has an electromagnetic motor and, depending on a force generated by the electromagnetic motor, generates a force in a direction in which a spring upper portion and a spring lower portion approach or separate from each other; plural contact-type relays that are respectively provided for the plural shock absorbers, and each of which switches between a connected state and a cutoff state, the connected state being a state where a power supply and the electromagnetic motor provided in one corresponding to a magnetic core of the plural shock absorbers are connected and a current flow therebetween is allowed, and the cutoff state being a state where the power supply and the electromagnetic motor are disconnected and the current flow between the electromagnetic motor and the power supply is thereby prevented; and a relay controller that controls each of the relays to selectively realize the connected state and the cutoff state of each of the shock absorbers, the relay controller being configured to normally realize the connected states of all of the shock absorbers and to realize the cutoff state of one of the shock absorbers in a situation where the generated current by the electromagnetic motor provided in one of the shock absorbers is predicted to exceed a set current that is set in consideration of occurrence of a welding phenomenon of the relay.

SUMMARY

However, due to a characteristic of the motor, the electromagnetic shock absorber has such a problem that a damping force is saturated in a speed range where a stroke speed of a movable shaft causing an operation of the movable shaft of the absorber becomes equal to or higher than a specified speed.

The present disclosure provides a suspension device capable of increasing a damping force in a speed range where the damping force is saturated due to a characteristic of a motor.

A suspension device according to one aspect of the present disclosure includes: a spring provided between an upper member and a lower member; a motor provided in juxtaposition with the spring to generate power in accordance with a speed at which a movable shaft is operated, the movable shaft being movable in accordance with operations of the upper member and the lower member in an expansion-contraction direction of the spring; a power consumption circuit including a variable load circuit, the variable load circuit being configured to generate a damping force in the motor by consuming the power generated in the motor and to change the damping force; and an electronic control unit configured to control the variable load circuit such that consumed power by the variable load circuit is increased along with an increase in a speed of the movable shaft.

According to the above aspect, a resistance value of variable resistor in the power consumption circuit is increased along with an increase in an operation speed of the motor. As a result, the consumed power in the power consumption circuit is increased. Thus, a reduction in the damping force can be suppressed in a speed range where the damping force is saturated due to a characteristic of the motor.

In the above aspect, the electronic control unit may be configured to maintain a resistance value of the variable load circuit to a specified value when the speed of the movable shaft is equal to or lower than a specified speed.

According to the above configuration, when the speed of the movable shaft of the motor is equal to or lower than the specified speed, the resistance value of the variable resistor is set to a fixed resistance value, with which a difference between the damping force and a reference damping force serving as a reference of the damping force falls within a certain range. Note that, when the speed of the movable shaft of the motor is equal to or higher than the specified speed, the damping force that is saturated with the fixed resistance value is compensated by changing the resistance value of the variable resistor. In this way, a characteristic of the suspension device can be brought close to an ideal state.

In the above aspect, the electronic control unit may have a conversion table that indicates a relationship between the speed of the movable shaft and a resistance value of the variable load circuit, and may be configured to output a load resistance value setting signal based on refer the conversion table, the load resistance value setting signal being used to set the resistance value of the variable load circuit to a value corresponding to the speed of the movable shaft.

According to the above configuration, a value of the load resistance value setting signal can be determined at a high speed.

In the above aspect, the variable load circuit may have: a load resistor that has a predetermined resistance value; and a switch connected in series with the load resistor, and the electronic control unit may be configured to generate a pulse width modulation signal such that a duty ratio is reduced as a resistance value of the variable load circuit is increased, the pulse width modulation signal being used to switch an opened-closed state of the switch.

According to the above configuration, the resistance value on a time axis can be changed. Thus, a scale of the circuit can be reduced, and a response speed of a change in the resistance value can be increased.

In the above aspect, the electronic control unit may be configured to switch an operation between a first operation mode and a second operation mode in accordance with a mode switching signal provided from outside. The electronic control unit may be configured to, in the first operation mode, control a resistance value of the variable load circuit such that the resistance value of the variable load circuit is increased along with an increase in the speed of the movable shaft, and in the second operation mode, control the resistance value of the variable load circuit such that the damping force in the variable load circuit becomes the largest for the speed of the movable shaft.

According to the above configuration, the operation mode in which a regenerative amount of the power generated by the motor is maximized can be added.

In the above aspect, the electronic control unit may have: a first conversion table that indicates a relationship between the speed of the movable shaft and the resistance value of the variable load circuit, the first conversion table being provided for the first operation mode; a second conversion table that indicates a relationship between the speed of the movable shaft and the resistance value of the variable load circuit, the second conversion table being provided for the second operation mode; and the electronic control unit may be configured to read a duty ratio setting value used to realize the speed of the movable shaft and the resistance value of the variable load circuit from either one of the first conversion table and the second conversion table in accordance with the mode switching signal and to generate a pulse width modulation signal with the duty ratio that corresponds to the read duty ratio setting value.

According to the above configuration, a value of the load resistance value setting signal can be determined at a high speed.

In the above aspect, the electronic control unit may be configured to generate a load resistance value setting signal including a duty ratio that corresponds to the speed of the movable shaft, and the variable load circuit may include: a buck-boost circuit that is configured to steps up or steps down a motor voltage generated in the motor based on of the load resistance value setting signal to generate an output voltage with a constant voltage value; and a secondary battery, to which the output voltage is applied, and to which regenerative power generated in the motor is stored.

According to the above configuration, the power generated by the motor can be regenerated to the secondary battery.

In the above aspect, the duty ratio of the load resistance value setting signal may be set such that the damping force generated by the variable load circuit by consuming the power generated in the motor becomes a target damping force.

According to the above configuration, while the power generated in the motor is regenerated to the secondary battery, a damping force characteristic of the suspension device can realize the target damping force.

The suspension device according to the present disclosure can increase the damping force in a speed range where the damping force is saturated due to a characteristic of the motor.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 6 is a block diagram of configurations of a resistance value control section and a variable resistor according to the second embodiment;

FIG. 7 is a graph that illustrates a damping characteristic of an absorber according to the second embodiment;

DETAILED DESCRIPTION OF EMBODIMENTS

Figure 1:
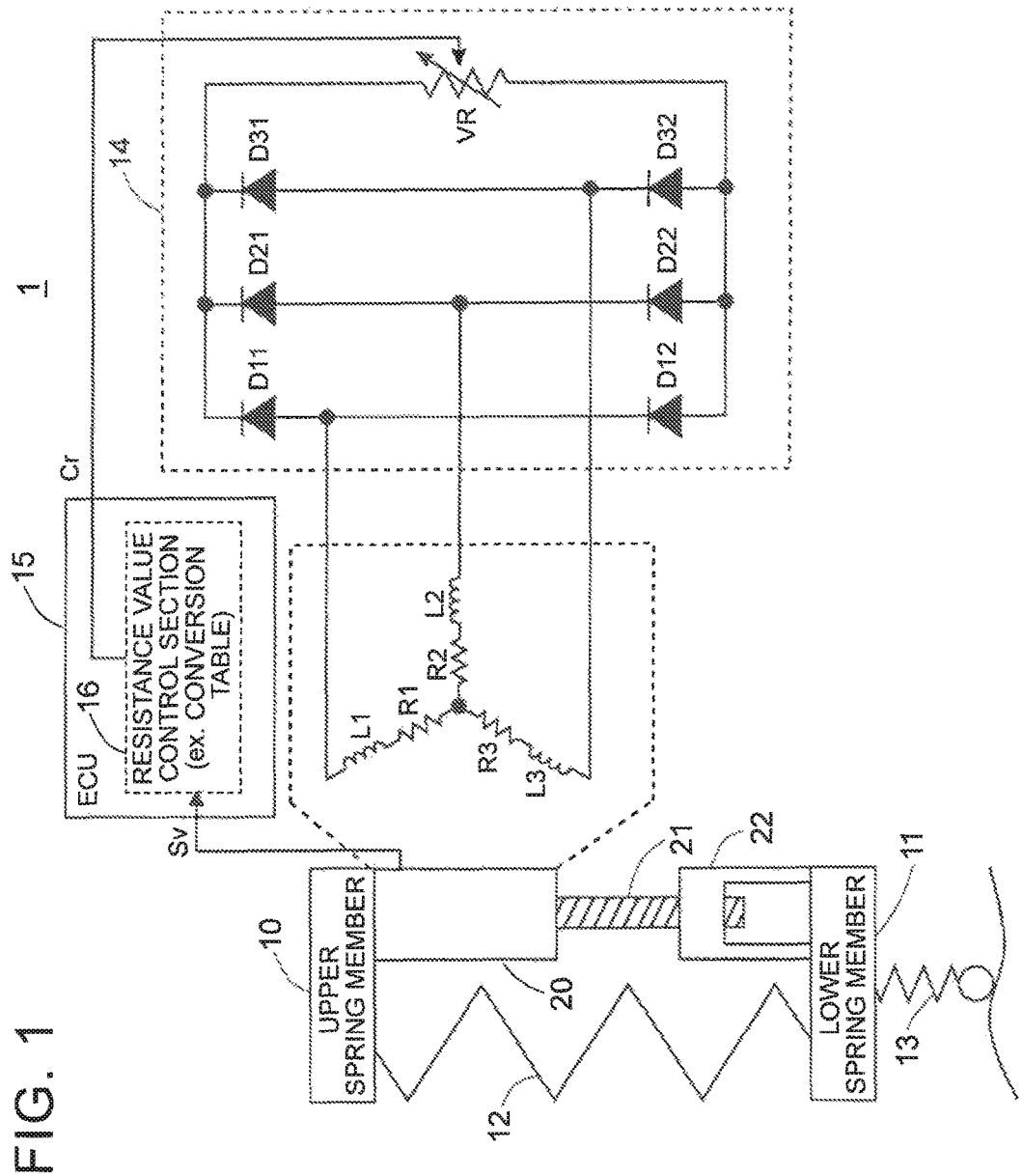
FIG. 1 is a block diagram that illustrates a configuration of a suspension device according to a first embodiment.

A description will hereinafter be made on embodiments of the present disclosure with reference to the drawings. For clarification of the description, the following description and the drawings will appropriately be omitted or simplified. In each of the drawings, the same element is denoted by the same reference numeral, and an overlapping description thereon will not be made when necessary.

First, a description will be made on a configuration of a suspension device 1 according to a first embodiment. FIG. 1 is a block diagram that illustrates the configuration of the suspension device 1 according to the first embodiment.

As shown in FIG. 1, the suspension device 1 according to the first embodiment has an upper member (for example, an upper spring member 10), a lower member (for example, a lower spring member 11), a spring 12, a tire 13, a motor 20, a ball screw 21, a screw support member 22, a power consumption circuit 14, and an electronic control circuit 15. In the suspension device 1 according to the first embodiment, the motor 20, the ball screw 21, and the screw support member 22 constitute an electromagnetic absorber.

The upper spring member 10 is connected to a vehicle body, for example. The lower spring member 11 is attached to a suspension arm that is attached to the vehicle, for example, and receives a force from the tire 13. In FIG. 1, the tire 13 is shown as a model that is configured by including a spring and a roller. The spring 12 is provided in a manner to be held between the upper spring member 10 and the lower spring member 11.

The motor 20 is provided in juxtaposition with the spring 12 and generates power in accordance with an operation speed of a movable shaft (hereinafter also referred to as a stroke speed) that is operated in accordance with operations of the upper spring member 10 and the lower spring member 11 in an expansion-contraction direction of the spring 12. The motor 20 generates a current in accordance with motion of the movable shaft and thereby generates a damping force.

The ball screw 21 and the screw support member 22 constitute an operation conversion mechanism. This operation conversion mechanism is disposed in series with the motor 20 between the upper spring member 10 and the lower spring member 11. The operation conversion mechanism converts an approaching-separating operation between the upper spring member 10 and the lower spring member 11 to the motion of the movable shaft of the motor 20. In the electromagnetic absorber according to the first embodiment, when the upper spring member 10 and the lower spring member 11 perform the approaching-separating operation, the screw support member 22 causes rotation of the ball screw 21 in accordance with said approaching-separating operation, and the movable shaft of the motor 20, which is coupled to the ball screw 21, rotates in an orthogonal direction to an approaching-separating direction.

FIG. 1 also shows a circuit model of the motor 20. The motor 20 is a three-phase motor, for example, and can be illustrated as a model that has coils L1 to L3 and resistors R1 to R3, one ends of which are respectively connected to one ends of the coils L1 to L3, in which the other ends of the resistors R1 to R3 are connected, and in which the generated current is output from each of the other ends of the coils L1 to L3.

The power consumption circuit 14 converts the generated current output from the motor 20 to heat. That is, the power consumption circuit 14 converts electrical energy generated by a regenerative operation of the motor 20 to thermal energy. In addition, the power consumption circuit 14 consumes power generated in the motor 20 and thereby changes the damping force generated in the motor 20. The power consumption circuit 14 has diodes D11, D12, D21, D22, D31, D32 and a variable load circuit (for example, a variable resistor VR).

The diode D11 and the diode D12 are connected in series between both ends of the variable resistor VR. The other end of the coil L1 is connected to a connection point at which an anode of the diode D11 and a cathode of the diode D12 are connected. The diode D21 and the diode D22 are connected in series between both of the ends of the variable resistor VR. The other end of the coil L2 is connected to a connection point at which an anode of the diode D21 and a cathode of the diode D22 are connected. The diode D31 and the diode D32 are connected in series between both of the ends of the variable resistor VR. The other end of the coil L3 is connected to a connection point at which an anode of the diode D31 and a cathode of the diode D32 are connected.

The electronic control circuit 15 is an integrated circuit such as a microcontroller unit (MCU) and includes: an arithmetic circuit capable of executing a program; and a peripheral circuit having various functions and used by the arithmetic circuit. In an example shown in FIG. 1, the electronic control circuit 15 includes a load control section (for example, a resistance value control section 16). The resistance value control section 16 controls the variable resistor VR such that a resistance value of the variable resistor VR is increased as a movable speed of the movable shaft of the motor 20 is increased. The resistance value control section 16 receives a stroke speed measured value Sv and outputs a load resistance value setting signal Cr used to set the resistance value of the variable resistor VR to the resistance value that corresponds to the stroke speed of the movable shaft indicated by said stroke speed measured value Sv.

Figure 2:
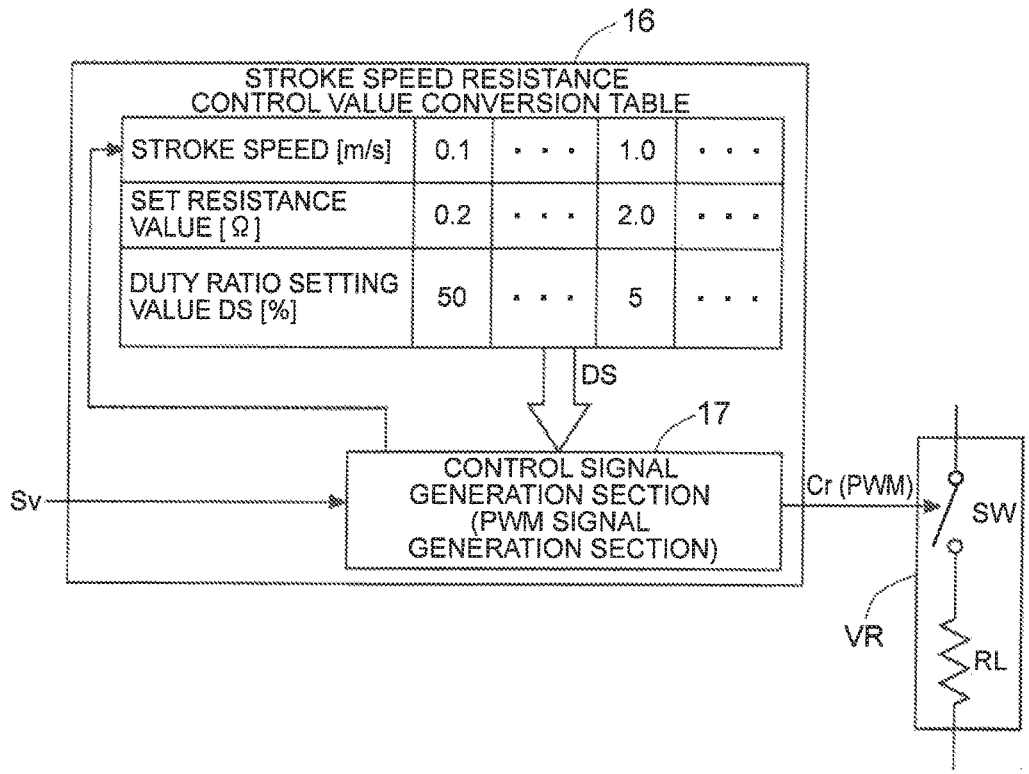
FIG. 2 is a block diagram of configurations of a resistance value control section and a variable resistor according to the first embodiment.

Here, a detailed description will be made on the resistance value control section 16 and the variable resistor VR. FIG. 2 is a block diagram that illustrates configurations of the resistance value control section 16 and the variable resistor VR according to the first embodiment.

As shown in FIG. 2, the resistance value control section 16 has a conversion table (for example, a stroke speed resistance control value conversion table) and a control signal generation section 17. The stroke speed resistance control value conversion table shows a relationship between the speed of the movable shaft of the motor 20 and a resistance value of the variable resistor. In addition, in the stroke speed resistance control value conversion table, a duty ratio setting value of a pulse width modulation (PWM) signal is described as a resistance control value for realizing the resistance value of the variable resistor VR that corresponds to the speed of the movable shaft of the motor 20.

The control signal generation section 17 refers to the conversion table by using the stroke speed measured value Sv obtained from the motor 20 and outputs a load resistance value setting signal (for example, the PWM signal) used to set the resistance value of the variable resistor to a value corresponding to the movable speed of the movable shaft of the motor 20. More specifically, the control signal generation section 17 reads a duty ratio setting value DS that corresponds to the stroke speed measured value Sv obtained from the motor 20, and changes the duty ratio of the output PWM signal.

In addition, as shown in FIG. 2, the variable resistor VR has a load resistor RL and a switch SW. The switch SW is connected in series with the load resistor RL. The load resistor RL is a resistor whose resistance value is determined in advance.

In the suspension device 1 according to the first embodiment, opened-closed states of the switch SW of the variable resistor VR are switched by the PWM signal output by the control signal generation section 17. In this way, the resistance value of the variable resistor VR is changed on a time axis. That is, the load resistor RL becomes effective when the switch SW is in the closed state, and the load resistor RL becomes void when the switch SW is in the opened state. Accordingly, the suspension device 1 according to the first embodiment changes the resistance value of the variable resistor VR by changing a period in which the load resistor RL becomes effective by the PWM signal. More specifically, when the duty ratio of the PWM signal is 50%, the resistance value of the variable resistor VR becomes the resistance value that is twice as large as the resistance value of the load resistor RL. When the duty ratio of the PWM signal is 5%, the resistance value of the variable resistor VR becomes the resistance value that is 20 times as large as the resistance value of the load resistor RL. When the duty ratio of the PWM signal is 100%, the resistance value of the variable resistor VR becomes the resistance value that is equal to the resistance value of the load resistor RL.

In the suspension device 1 according to the first embodiment, the resistance value control section 16 generates the PWM signal such that the duty ratio is reduced as the resistance value of the variable resistor VR is increased.

Figure 3:
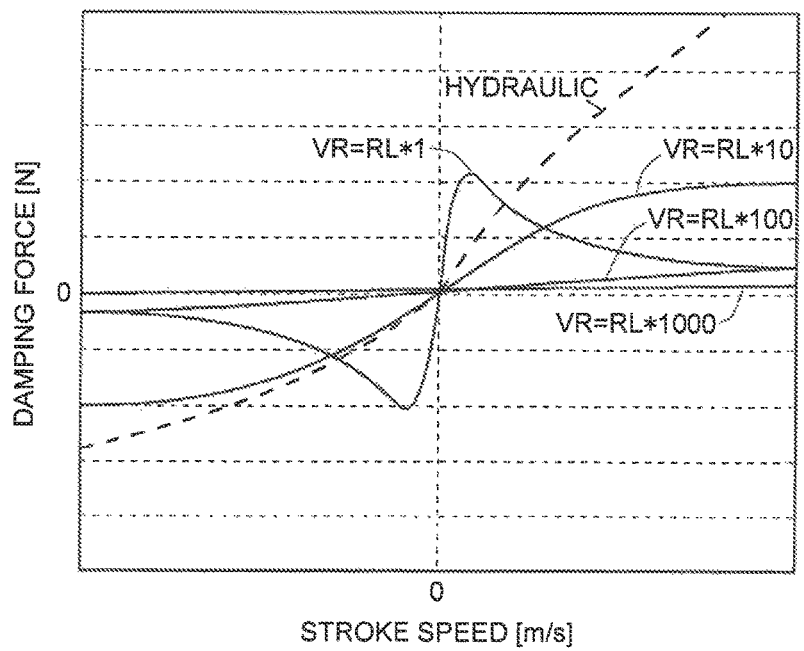
FIG. 3 is a graph that illustrates a damping force of an absorber in a case where the resistance value is changed in the suspension device according to the first embodiment.

Next, a description will be made on a relationship between the resistance value of the variable resistor VR and the damping force generated in the motor 20. FIG. 3 is a graph that illustrates the damping force of the absorber in a case where the resistance value is changed in the suspension device 1 according to the first embodiment. Note that FIG. 3 shows the damping force of a hydraulic absorber as an ideal value of the damping force generated in the motor 20. As shown in FIG. 3, in a stroke speed range of the movable shaft of the motor 20 that is assumed in the suspension device 1, the damping force of the hydraulic absorber has a characteristic of being simply increased. On the other hand, when the motor 20 is used as the absorber, a peak value of the damping force differs by a magnitude of the resistance value of the variable resistor VR. More specifically, when the motor 20 is used as the absorber, the stroke speed at which the damping force becomes the largest is increased as the resistance value of the variable resistor VR is increased.

Figure 4:
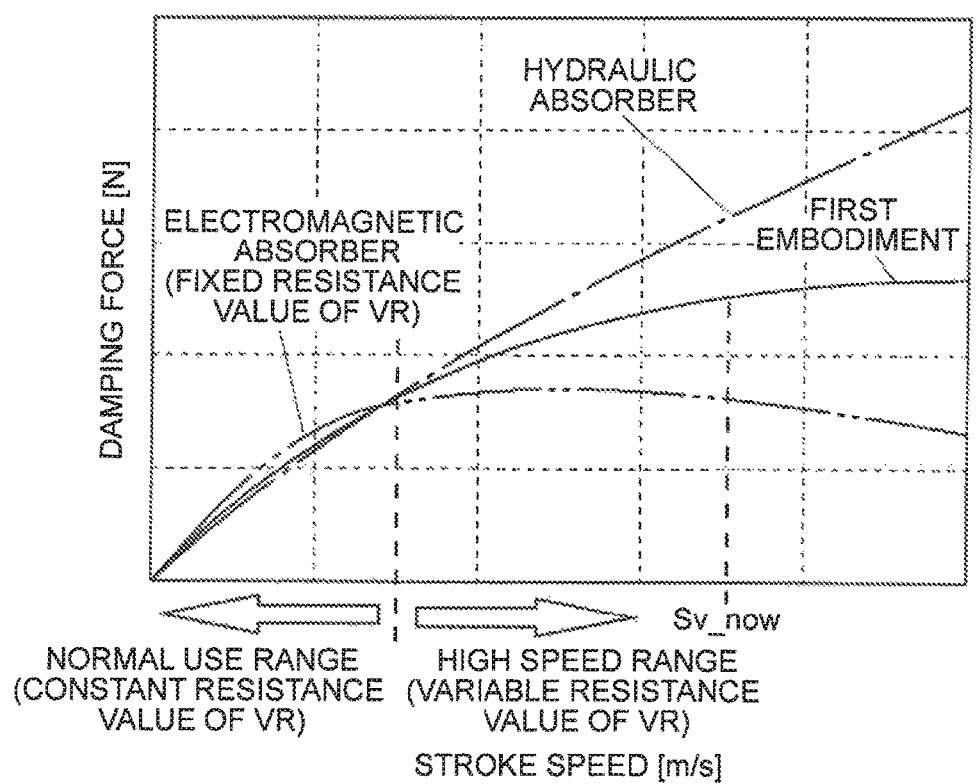
FIG. 4 is a graph that illustrates a damping characteristic of the absorber according to the first embodiment.

Next, FIG. 4 is a graph that illustrates a damping characteristic of the absorber of the suspension device 1 according to the first embodiment. As shown in FIG. 4, in the suspension device 1 according to the first embodiment, in a region where the speed of the movable shaft of the motor 20 is equal to or lower than a certain speed (for example, a normal use range where a frequency of use is high as an operation situation of the suspension device 1) as an operation situation of the suspension device 1, the resistance value of the variable resistor VR is fixed to the certain value. In this way, in the suspension device 1 according to the first embodiment, ride quality for a user of the vehicle is improved.

Meanwhile, in the suspension device 1 according to the first embodiment, in a region where the speed of the movable shaft of the motor 20 is higher than the certain speed as the operation situation of the suspension device 1 (for example, a high-speed range where a separating operation speed between the upper spring member 10 and the lower spring member 11 is high while the frequency of the use is low as the operation situation of the suspension device 1), the resistance value of the variable resistor VR is changed to realize the largest damping force. In this way, the suspension device 1 according to the first embodiment can reduce width in which the damping force is saturated and a damping force characteristic deviates from that of the hydraulic absorber when the resistance value of the variable resistor VR is fixed.

From the above description, in the suspension device 1 according to the first embodiment, the resistance value control section 16 controls the variable resistor VR such that the resistance value of the variable resistor VR is increased in accordance with a magnitude of the speed of the movable shaft of the motor 20. In this way, a saturated state of the damping force of the motor 20, which is caused by the variable resistor VR, can be avoided, and the damping force of the motor 20 can be increased to fall within the region where the speed of the movable shaft of the motor 20 is high.

In the suspension device 1 according to the first embodiment, when the speed of the movable shaft of the motor 20 is equal to or lower than the certain speed, the resistance value of the variable resistor is maintained to be constant. In this way, in the suspension device 1 according to the first embodiment, the damping characteristic of the absorber can be brought close to the ideal damping characteristic of the hydraulic absorber.

In the suspension device 1 according to the first embodiment, when the resistance value of the variable resistor VR is controlled in accordance with the speed of the movable shaft of the motor 20, the duty ratio of the load resistance value setting signal Cr, which controls the resistance value of the variable resistor VR, is determined by referring to the conversion table. In this way, in the suspension device 1 according to the first embodiment, the duty ratio of the load resistance value setting signal Cr can be changed at a high speed. In particular, because the movable speed of the movable shaft of the motor 20 is changed in the suspension device from time to time, it is preferred to change the duty ratio at the high speed. That is, the damping force can be maintained in a high state by changing the duty ratio at the high speed.

In the suspension device 1 according to the first embodiment, the resistance value of the variable resistor VR is changed on the basis of an opened-closed ratio of the switch SW, which is provided in series with the load resistor RL. In this way, in the suspension device 1 according to the first embodiment, an open-circuit scale of the circuit, which realizes the variable resistor VR, can be reduced, and the switching speed of the resistance value can be improved.

Second Embodiment

In a second embodiment, a description will be made on a suspension device 2 as a different embodiment of the suspension device 1. Note that, in the description of the suspension device 2 according to the second embodiment, components that have been described in the first embodiment will be denoted by the same reference numerals as those in the first embodiment and the description thereon will not be made.

Figure 5:
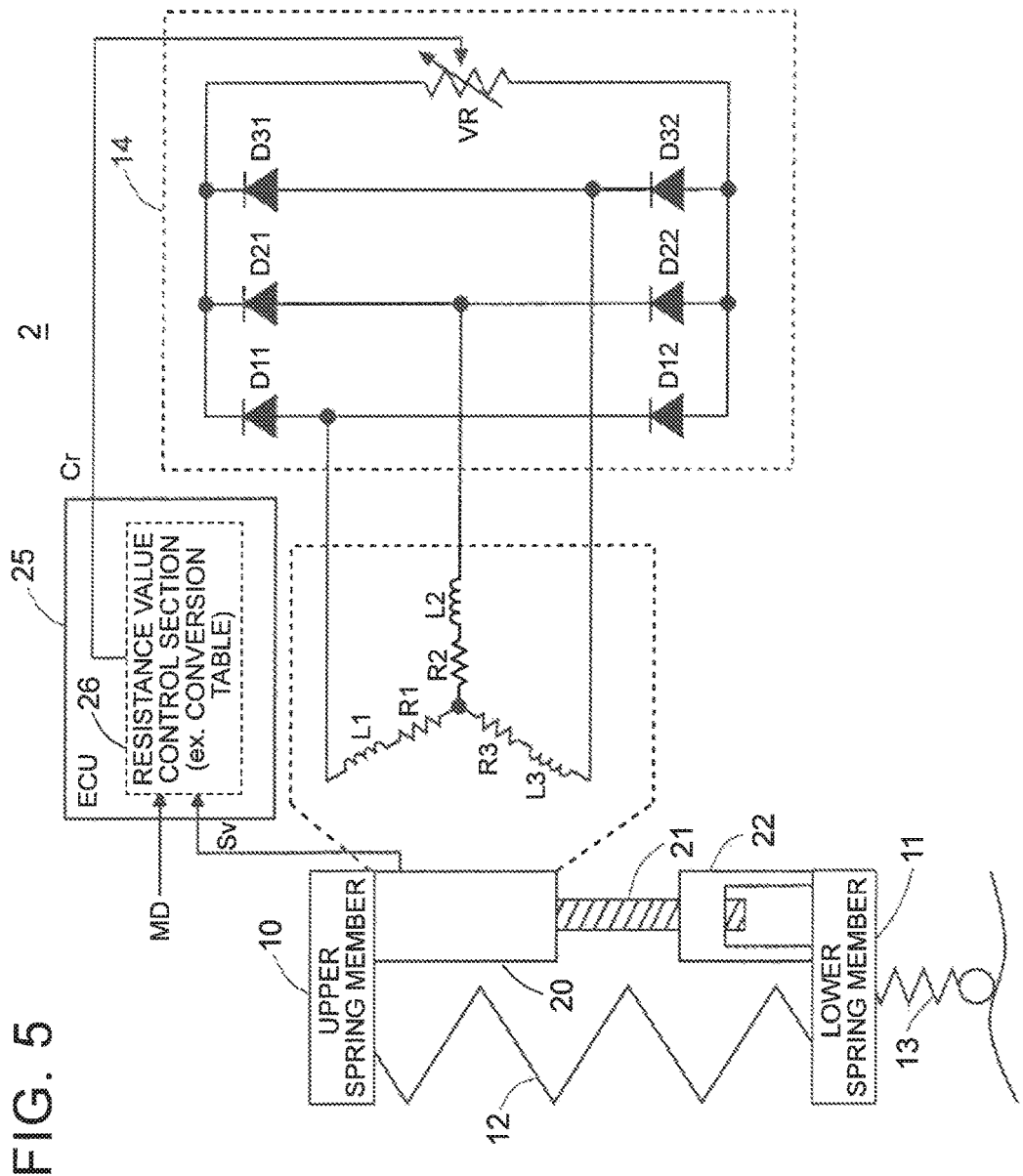
FIG. 5 is a block diagram of a configuration of a suspension device according to a second embodiment.

FIG. 5 is a block diagram of a configuration of the suspension device according to the second embodiment. As shown in FIG. 5, in the suspension device 2 according to the second embodiment, the electronic control circuit 15 of the suspension device 1 according to the first embodiment is changed to an electronic control circuit 25. The electronic control circuit 25 has a load control section (for example, a resistance value control section 26). The resistance value control section 26 switches an operation mode between a first operation mode and a second operation mode in accordance with a mode switching signal MD received from outside. In the first operation mode, the resistance value control section 26 controls the resistance value of the variable resistor VR such that the resistance value of the variable resistor VR is increased as the speed of the movable shaft of the motor 20 is increased. In the second operation mode, the resistance value control section 26 controls the resistance value of the variable resistor VR such that the damping force in the variable resistor VR becomes the largest for the speed of the movable shaft of the motor 20.

Here, a detailed description will be made on the resistance value control section 26. FIG. 6 is a block diagram of configurations of the resistance value control section 26 and the variable resistor VR according to the second embodiment. As shown in FIG. 6, the resistance value control section 26 has a first conversion table (for example, a first stroke speed resistance control value conversion table), a second conversion table (for example, a second stroke speed resistance control value conversion table), and a control signal generation section 27.

The first stroke speed resistance control value conversion table is the same as the stroke speed resistance control value conversion table in the first embodiment. More specifically, the first stroke speed resistance control value conversion table is provided for the first operation mode and shows a relationship between the speed of the movable shaft of the motor 20 and the resistance value of the variable resistor VR. The second stroke speed resistance control value conversion table is provided for the second operation mode and shows a relationship between the speed of the movable shaft of the motor 20 and the resistance value of the variable resistor VR.

More specifically, in the first stroke speed resistance control value conversion table, a relationship between such a speed that the resistance value of the variable resistor VR is increased along with the increase in the speed of the movable shaft and a duty ratio setting value DS1 in a region where the speed of the movable shaft of the motor 20 is equal to or higher than a certain speed is described. Meanwhile, in the second stroke speed resistance control value conversion table, such a relationship between the speed of the movable shaft and a duty ratio setting value DS2 that the damping force generated in the motor 20 becomes the largest for the speed of the movable shaft regardless of the speed of the movable shaft of the motor 20 is described.

The control signal generation section 27 reads the duty ratio setting value for realizing the speed of the movable shaft and the resistance value of the variable resistor VR from either one of the first stroke speed resistance control value conversion table and the second stroke speed resistance control value conversion table in accordance with the mode switching signal MD and generates the PWM signal that has the duty ratio corresponding to the read duty ratio setting value.

Next, a description will be made on the damping characteristic of the absorber in the suspension device 2 according to the second embodiment. FIG. 7 is a graph that illustrates the damping characteristic of the absorber according to the second embodiment. In an example shown in FIG. 7, Sv1 to Sv4 are shown as the stroke speeds, at each of which the resistance value of the variable resistor VR is changed. As shown in FIG. 7, in the suspension device 2 according to the second embodiment, the resistance value of the variable resistor VR is changed to realize the largest damping force for each of the speeds of the movable shaft of the motor 20 (for example, the stroke speeds Sv1 to Sv4). In addition, in the suspension device 2 according to the second embodiment, switching timing of the resistance value of the variable resistor VR corresponds to the stroke speed at which damping force curves DC corresponding to the stroke speeds cross each other. In this way, the suspension device 2 according to the second embodiment has such a characteristic that the damping force of the absorber is changed along a ridge of the damping force curve DC that differs by the resistance value of the variable resistor VR.

From the above description, in the suspension device 2 according to the second embodiment, the resistance value of the variable resistor VR is changed to realize the largest damping force regardless of the speed of the movable shaft of the motor 20. In this way, in the suspension device 2 according to the second embodiment, the regenerative power generated in the motor 20 can most efficiently be recovered. Note that, in order to recover the regenerative power generated in the motor 20, a power regeneration circuit (for example, an AC-DC conversion circuit) is used, and a resistance value of a portion in this power regeneration circuit that receives the regenerative power of the motor 20 has to be changed in a similar manner to that of the variable resistor VR shown in FIG. 5 and FIG. 6.

Third Embodiment

In a third embodiment, a description will be made on a suspension device 3 as another embodiment of the suspension device 1. Note that, in the description of the suspension device 3 according to the third embodiment, components that have been described in the first embodiment will be denoted by the same reference numerals as those in the first embodiment and the description thereon will not be made.

Figure 8:
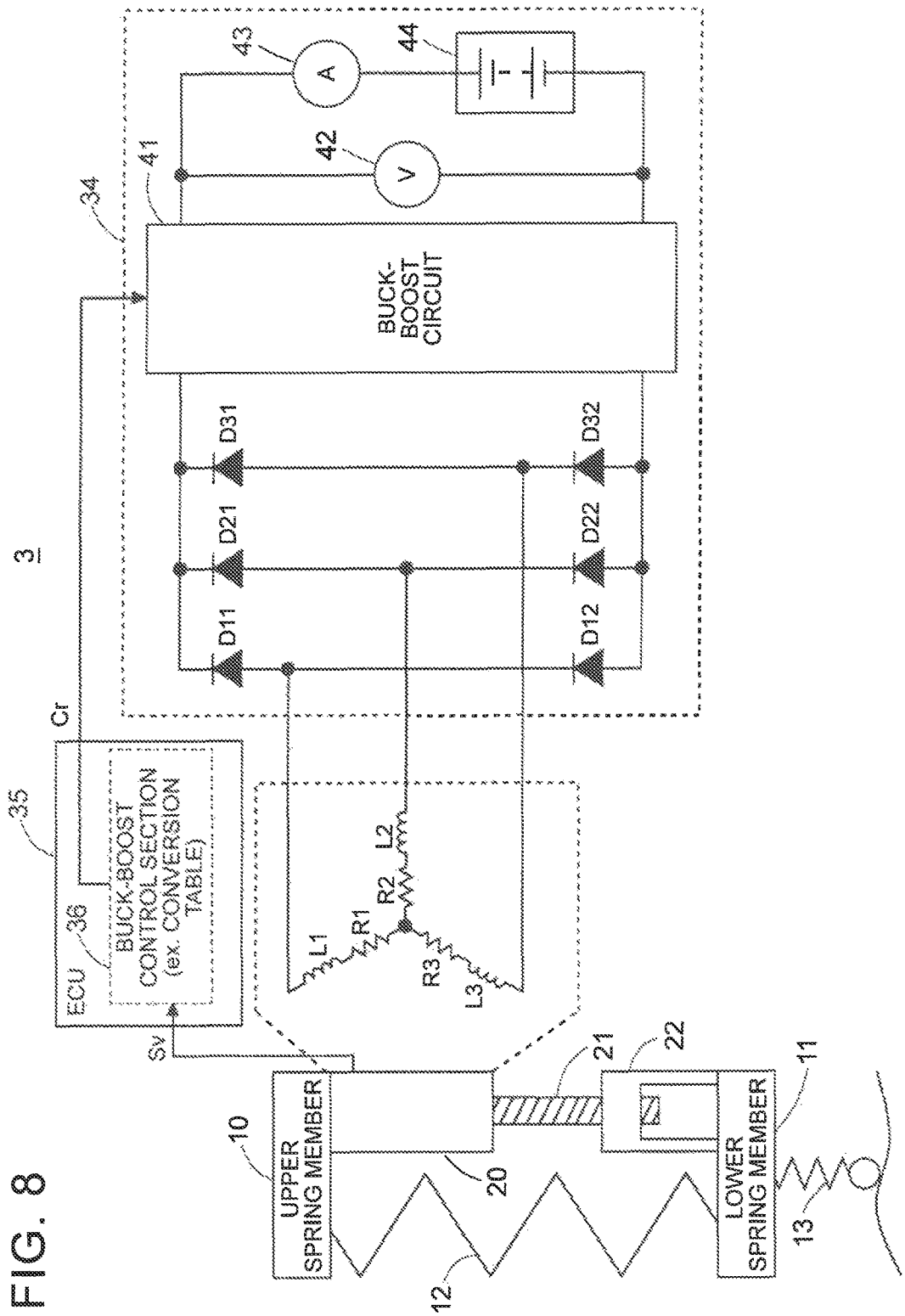
FIG. 8 is a block diagram of a configuration of a suspension device according to a third embodiment.

FIG. 8 is a block diagram of a configuration of the suspension device according to the third embodiment. As shown in. FIG. 8, in the suspension device 3 according to the third embodiment, the power consumption circuit 14 of the suspension device 1 according to the first embodiment is replaced with a power consumption circuit 34, and the electronic control circuit 15 is replaced with an electronic control circuit 35. That is, the power consumption circuit 34 of the suspension device 3 according to the third embodiment includes a buck-boost circuit 41 as a specific example of a regenerative power circuit realized by the variable resistor VR of the suspension device 2 according to the second embodiment.

As the variable load circuit, the power consumption circuit 34 has the buck-boost circuit 41 and a secondary battery (for example, a battery 44). The power consumption circuit 34 also has: a voltage measurement device 42 that measures a voltage value used for control of the battery 44; and a current measurement device 43 that measures a current value. The buck-boost circuit 41 steps up or steps down a motor voltage (for example, a voltage difference between the cathodes of the diodes D11, D21, D31 and the anodes of the diodes D12, D22, D32) generated in the motor 20 on the basis of the load resistance value setting signal Cr and generates an output voltage Vout with a constant voltage value. Then, the output voltage Vout of the buck-boost circuit 41 is applied to the battery 44, and the regenerative power generated in the motor 20 is stored therein.

The electronic control circuit 35 includes the load control section (for example, a buck-boost control section 36). The buck-boost control section 36 receives the speed of the movable shaft of the motor 20 as the stroke speed measured value Sv and outputs the load resistance value setting signal Cr with the duty ratio that corresponds to the received stroke speed measured value Sv. This buck-boost control section 36 has a control signal generation section and a conversion table as shown in FIG. 2, for example, and outputs the load resistance value setting signal Cr with the duty ratio that corresponds to the stroke speed measured value Sv provided by the motor 20. This conversion table shows a correlation between the stroke speed and the duty ratio as shown in FIG. 2, for example. In the conversion table provided in the buck-boost control section 36, such a duty ratio, with which the damping force, which is generated when the buck-boost circuit 41 consumes the regenerative power of the motor 20, becomes a target damping force set in accordance with the stroke speed measured value Sv, is described.

Figure 9:
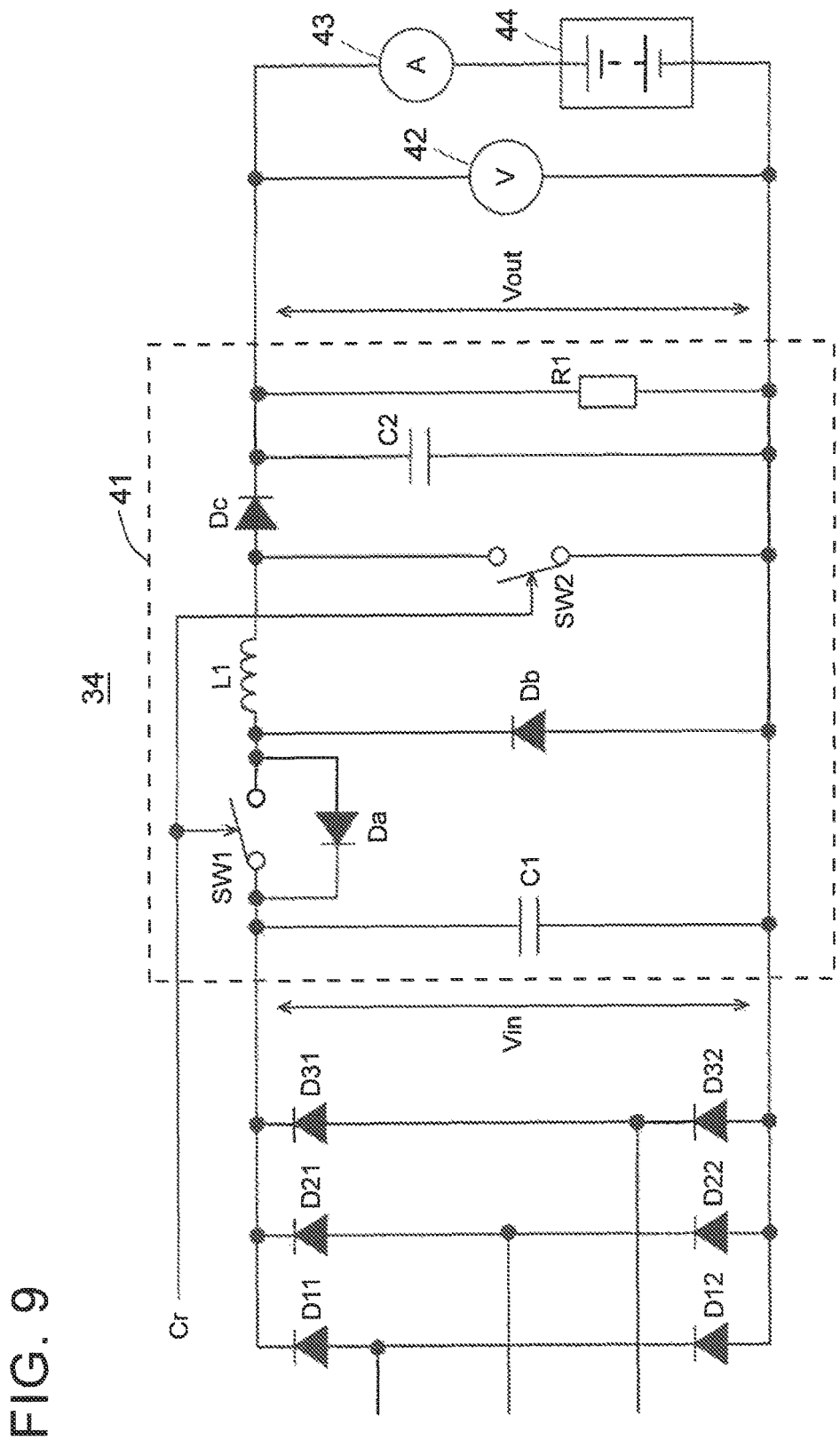
FIG. 9 is a circuit diagram of a buck-boost circuit of the suspension device according to the third embodiment.

Here, a detailed description will be made on the buck-boost circuit 41. FIG. 9 is a circuit diagram of the buck-boost circuit of the suspension device 3 according to the third embodiment. As shown in FIG. 9, the buck-boost circuit 41 according to the third embodiment has switches SW1, SW2, capacitors C1, C2, a coil L1, and diodes Da to Dc. Note that, in the following description, a wire to which the cathodes of the diodes D11, D21, D31 are connected, a wire connected to a positive electrode of the battery 44 among output wires of the buck-boost circuit 41, and a wire to which the anodes of the diodes D12, D22, D32 are connected are respectively referred to as an input positive electrode wire, an output positive electrode wire, and a negative electrode wire. A negative electrode of the battery 44 is connected to the negative electrode wire. In the suspension device 3 according to the third embodiment, a motor voltage Vin that is generated by the regenerative operation of the motor 20 is generated between the input positive electrode wire and the negative electrode wire, and this motor voltage Vin is received by the buck-boost circuit 41. The buck-boost circuit 41 generates the output voltage Vout between the output positive electrode wire and the negative electrode wire.

The capacitor C1 is connected between the input positive electrode wire and the negative electrode wire. One end of the switch SW1 is connected to the input positive electrode wire. An anode of the diode Da is connected to the other end of the switch SW1, and a cathode of the diode Da is connected to the one end of the switch SW1. An anode of the diode Db is connected to the negative electrode wire. A cathode of the diode Db is connected to the other end of the switch SW1. An opened-closed state of the switch SW1 is controlled by the load resistance value setting signal Cr.

One end of the coil L1 is connected to the other end of the switch SW1. One end of the switch SW2 is connected to the other end of the coil L1. The other end of the switch SW2 is connected to the negative electrode. An anode of the diode Dc is connected to the other end of the coil L1. A cathode of the diode Dc is connected to the output positive electrode wire. The capacitor C1 is connected between the output positive electrode wire and the negative electrode wire. A resistor R1 is connected between the output positive electrode wire and the negative electrode wire.

Each parameter of the buck-boost circuit 41 is set such that the motor voltage Vin and the output voltage Vout becomes an equal voltage when the duty ratio of the load resistance value setting signal Cr is 50%. When the duty ratio of the load resistance value setting signal Cr becomes higher than 50%, the buck-boost circuit 41 steps up the output voltage Vout to be a higher voltage than the motor voltage Vin. Meanwhile, when the duty ratio of the load resistance value setting signal Cr becomes lower than 50%, the buck-boost circuit 41 steps down the output voltage Vout to be a lower voltage than the motor voltage Vin.

Figure 10:
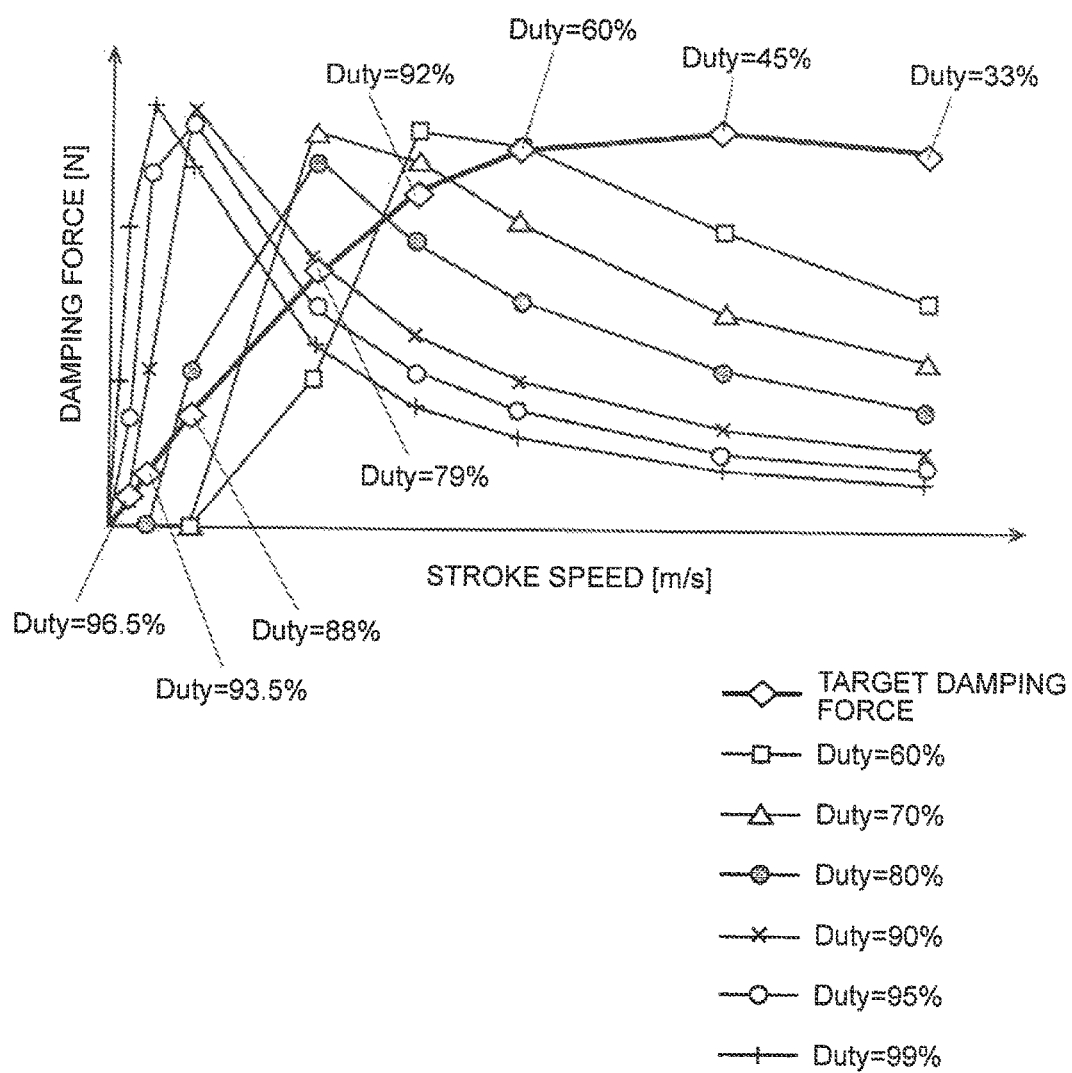
FIG. 10 is a graph that illustrates a damping characteristic of an absorber according to the third embodiment.

Here, a description will be made on a relationship between the duty ratio of the load resistance value setting signal Cr, which is provided to the buck-boost circuit 41, and the damping force generated in the motor 20. FIG. 10 is a graph that illustrates a damping characteristic of an absorber according to the third embodiment. As shown in FIG. 10, in the suspension device 3 according to the third embodiment, in the case where the stroke speed of the motor 20 is low, the larger damping force can be obtained as the duty ratio is increased. Meanwhile, in the suspension device 3 according to the third embodiment, in the case where the stroke speed of the motor 20 is high, the larger damping force can be obtained as the duty ratio is reduced.

Then, in the suspension device 3 according to the third embodiment, the duty ratio is changed in accordance with the stroke speed so as to obtain the target damping force. In an example shown in FIG. 10, along with the increase in the stroke speed, the duty ratio is changed to 96.5%, 93.5%, 88%, 79%, 92%, 60%, 45%, and 33%. In this way, the damping force that is equal to the target damping force is obtained.

Figure 11:
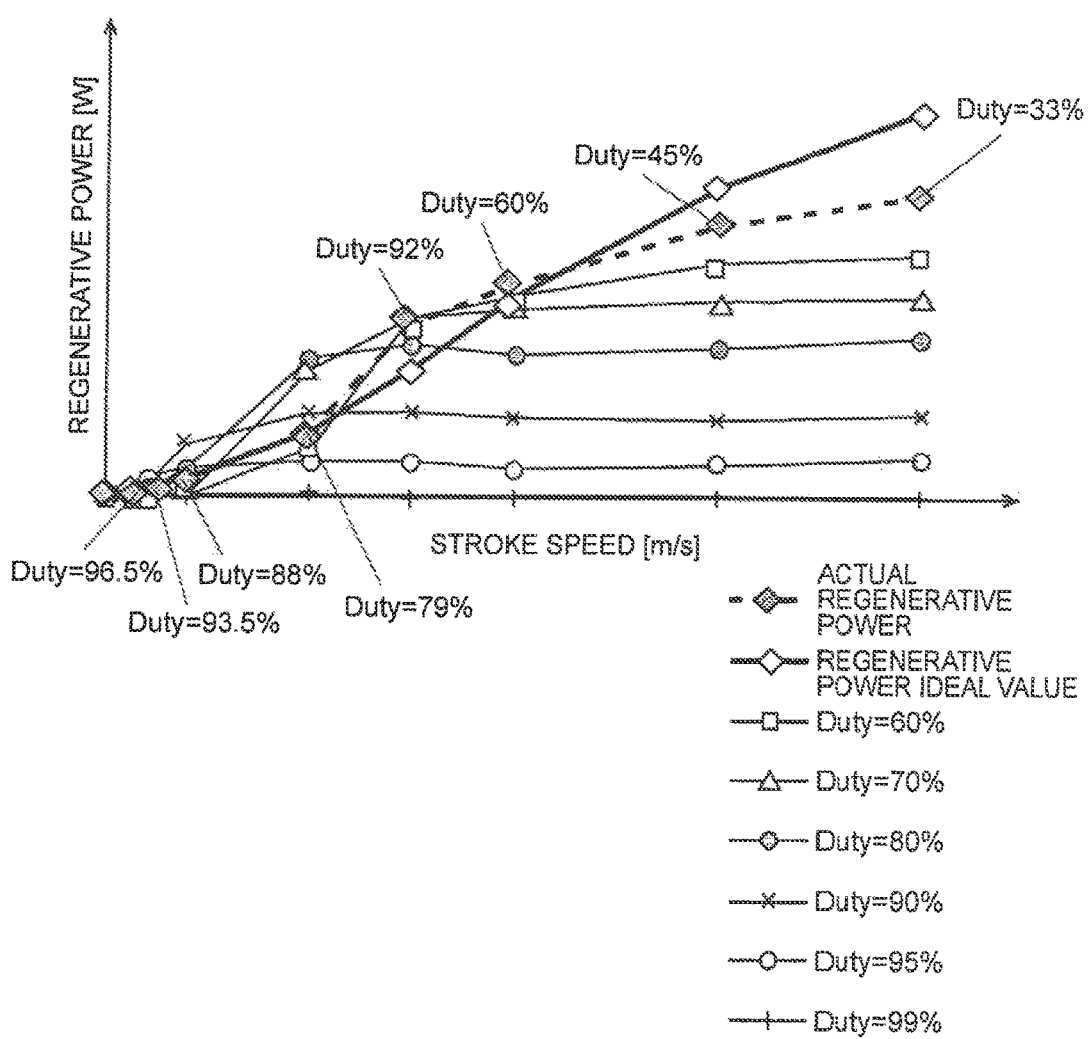
FIG. 11 is a graph that illustrates regenerative power of the absorber according to the third embodiment.

Next, a description will be made on a relationship between the duty ratio of the load resistance value setting signal Cr provided to the buck-boost circuit 41 and the regenerative power regenerated by the buck-boost circuit 41. FIG. 11 is a graph that illustrates the regenerative power of the absorber according to the third embodiment. As shown in FIG. 11, it is understood that, in the suspension device 3 according to the third embodiment, the power that can be regenerated is increased as the stroke speed of the motor 20 is increased. It is also understood that, the suspension device 3 according to the third embodiment has a significant tendency that a larger amount of the regenerative power can be obtained by reducing the duty ratio of the load resistance value setting signal Cr as the stroke speed of the motor 20 is increased. Furthermore, it is understood that, also in the case where the duty ratio of the load resistance value setting signal Cr is changed to obtain the target damping force described in FIG. 10, the power that can be regenerated is increased as the stroke speed of the motor 20 is increased. FIG. 11 shows an ideal value of the power that can be regenerated with the target damping force. In an example shown in FIG. 11, a difference is observed between this regenerative power ideal value and the actually obtained regenerative power, and it is considered that this difference is resulted from conversion efficiency, loss, or the like in the buck-boost circuit 41.

From the above description, in the suspension device 3 according to the third embodiment, the power consumption circuit 34 includes the buck-boost circuit 41 and the battery 44, which is charged with the regenerative power. In this way, the battery 44 can be charged with the regenerative power that is generated to dampen a rotational force of the motor 20.

In the above description, the present disclosure has specifically been described on the basis of the embodiments. However, it is needless to say that the present disclosure is not limited to the already-mentioned embodiments and various changes can be made thereto within the scope that does not depart from the gist of the present disclosure.

What is claimed is:
1. A suspension device comprising:
a spring provided between an upper member and a lower member;
a motor provided in juxtaposition with the spring to generate power in accordance with a speed at which a movable shaft is operated, the movable shaft being movable in accordance with operations of the upper member and the lower member in an expansion-contraction direction of the spring;
a power consumption circuit including a variable load circuit, the variable load circuit being configured to generate a damping force in the motor by consuming the power generated in the motor and to change the damping force; and
an electronic control unit configured to control the variable load circuit such that consumed power by the variable load circuit is increased along with an increase in a speed of the movable shaft, wherein
the electronic control unit is configured to maintain a resistance value of the variable load circuit to a specified value when the speed of the movable shaft is equal to or lower than a specified speed.

2. A suspension device comprising:
a spring provided between an upper member and a lower member;
a motor provided in juxtaposition with the spring to generate power in accordance with a speed at which a movable shaft is operated, the movable shaft being movable in accordance with operations of the upper member and the lower member in an expansion-contraction direction of the spring;
a power consumption circuit including a variable load circuit, the variable load circuit being configured to generate a damping force in the motor by consuming the power generated in the motor and to change the damping force; and
an electronic control unit configured to control the variable load circuit such that consumed power by the variable load circuit is increased along with an increase in a speed of the movable shaft, wherein
the electronic control unit has a conversion table that indicates a relationship between the speed of the movable shaft and a resistance value of the variable load circuit, and is configured to output a load resistance value setting signal based on refer the conversion table, the load resistance value setting signal being used to set the resistance value of the variable load circuit to a value corresponding to the speed of the movable shaft.

3. A suspension device comprising:
a spring provided between an upper member and a lower member;
a motor provided in juxtaposition with the spring to generate power in accordance with a speed at which a movable shaft is operated, the movable shaft being movable in accordance with operations of the upper member and the lower member in an expansion-contraction direction of the spring;
a power consumption circuit including a variable load circuit, the variable load circuit being configured to generate a damping force in the motor by consuming the power generated in the motor and to change the damping force; and
an electronic control unit configured to control the variable load circuit such that consumed power by the variable load circuit is increased along with an increase in a speed of the movable shaft, wherein
the variable load circuit has: a load resistor that has a predetermined resistance value; and a switch connected in series with the load resistor, and
the electronic control unit is configured to generate a pulse width modulation signal such that a duty ratio is reduced as a resistance value of the variable load circuit is increased, the pulse width modulation signal being used to switch an opened-closed state of the switch.

4. A suspension device comprising:
a spring provided between an upper member and a lower member;
a motor provided in juxtaposition with the spring to generate power in accordance with a speed at which a movable shaft is operated, the movable shaft being movable in accordance with operations of the upper member and the lower member in an expansion-contraction direction of the spring;
a power consumption circuit including a variable load circuit, the variable load circuit being configured to generate a damping force in the motor by consuming the power generated in the motor and to change the damping force; and
an electronic control unit configured to control the variable load circuit such that consumed power by the variable load circuit is increased along with an increase in a speed of the movable shaft, wherein
the electronic control unit is configured to switch an operation between a first operation mode and a second operation mode in accordance with a mode switching signal provided from outside, and
the electronic control unit is configured to,
in the first operation mode, control a resistance value of the variable load circuit such that the resistance value of the variable load circuit is increased along with an increase in the speed of the movable shaft, and
in the second operation mode, control the resistance value of the variable load circuit such that the damping force in the variable load circuit becomes the largest for the speed of the movable shaft.

5. The suspension device according to claim 4, wherein
the electronic control unit has: a first conversion table that indicates a relationship between the speed of the movable shaft and the resistance value of the variable load circuit, the first conversion table being provided for the first operation mode; a second conversion table that indicates a relationship between the speed of the movable shaft and the resistance value of the variable load circuit, the second conversion table being provided for the second operation mode; and
the electronic control unit is configured to read a duty ratio setting value used to realize the speed of the movable shaft and the resistance value of the variable load circuit from either one of the first conversion table and the second conversion table in accordance with the mode switching signal and to generate a pulse width modulation signal with the duty ratio that corresponds to the read duty ratio setting value.

6. A suspension device comprising:
a spring provided between an upper member and a lower member;
a motor provided in juxtaposition with the spring to generate power in accordance with a speed at which a movable shaft is operated, the movable shaft being movable in accordance with operations of the upper member and the lower member in an expansion-contraction direction of the spring;
a power consumption circuit including a variable load circuit, the variable load circuit being configured to generate a damping force in the motor by consuming the power generated in the motor and to change the damping force; and
an electronic control unit configured to control the variable load circuit such that consumed power by the variable load circuit is increased along with an increase in a speed of the movable shaft, wherein
the electronic control unit is configured to generate a load resistance value setting signal including a duty ratio that corresponds to the speed of the movable shaft, and
the variable load circuit includes: a buck-boost circuit that is configured to steps up or steps down a motor voltage generated in the motor based on of the load resistance value setting signal to generate an output voltage with a constant voltage value; and a secondary battery, to which the output voltage is applied, and to which regenerative power generated in the motor is stored.

7. The suspension device according to claim 6, wherein the duty ratio of the load resistance value setting signal is set such that the damping force generated by the variable load circuit by consuming the power generated in the motor becomes a target damping force.

\* \* \* \* \*